US011321380B2

(12) United States Patent
Rauchberger

(10) Patent No.: US 11,321,380 B2
(45) Date of Patent: May 3, 2022

(54) REAL TIME SYNCHRONIZATION OF CLIENT DEVICE ACTIONS WITH PRESENTED CONTENT

(71) Applicant: Vivi International Pty Ltd, South Yarra (AU)

(72) Inventor: Lior Rauchberger, Glen Eira (AU)

(73) Assignee: Vivi International Pty Ltd, South Yarra (AU)

( * ) Notice: Subject to any disclaimer, the term of this patent is extended or adjusted under 35 U.S.C. 154(b) by 384 days.

(21) Appl. No.: 16/533,840

(22) Filed: Aug. 7, 2019

(65) Prior Publication Data
US 2020/0050624 A1 Feb. 13, 2020

Related U.S. Application Data

(60) Provisional application No. 62/716,387, filed on Aug. 9, 2018.

(51) Int. Cl.
*G06F 7/00* (2006.01)
*G06F 16/438* (2019.01)
(Continued)

(52) U.S. Cl.
CPC ........ *G06F 16/4393* (2019.01); *G06F 16/436* (2019.01); *G06N 20/00* (2019.01); *H04L 51/046* (2013.01); *H04L 51/10* (2013.01)

(58) Field of Classification Search
CPC ... G06F 16/4393; G06F 16/436; G06N 20/00; H04L 51/046; H04L 51/10
See application file for complete search history.

(56) References Cited

U.S. PATENT DOCUMENTS 5,852,435 A * 12/1998 Vigneaux ............... G06F 16/40
345/428
6,073,127 A 6/2000 Lannert et al.
(Continued)

FOREIGN PATENT DOCUMENTS

WO WO 2020/031102 2/2020

OTHER PUBLICATIONS

International Preliminary Report on Patentability dated Feb. 18, 2021 From the International Bureau of WIPO Re. Application No. PCT/IB2019/056714. (8 Pages).
(Continued)

*Primary Examiner* — Nicholas Augustine

(57) ABSTRACT

A method of calculating feedback parameters for presentation images presented to spectators, comprising obtaining a presentation stream comprising a sequence of a plurality of presentation images, analyzing the presentation stream to identify a plurality of presentation periods of a presentation session, during each presentation period an associated one of the plurality of presentation images is presented to one or more spectators, receiving a plurality of feedback messages transmitted by client device(s) used by the spectator(s) to provide feedback to one or more of the presentation images, correlating each feedback message with one of the presentation images according to a presentation period during which the feedback message is received and transmitting the correlated feedback messages to feedback analysis system(s) adapted to calculate one or more feedback parameters for one or more presentation images based on the feedback extracted from the feedback messages correlated with one or more of the presentation images.

20 Claims, 3 Drawing Sheets

(51) Int. Cl.
*G06N 20/00* (2019.01)
*H04L 51/10* (2022.01)
*H04L 51/046* (2022.01)
*G06F 16/435* (2019.01)
*G06F 17/00* (2019.01)

(56) References Cited

U.S. PATENT DOCUMENTS

| | | | | |
|---|---|---|---|---|
| 6,332,147 | B1 * | 12/2001 | Moran | G06F 16/40 715/231 |
| 7,213,051 | B2 * | 5/2007 | Zhu | H04L 12/1831 709/248 |
| 7,930,302 | B2 * | 4/2011 | Bandaru | G06F 16/951 715/810 |
| 8,794,979 | B2 | 8/2014 | Beavers et al. | |
| 9,092,829 | B2 | 7/2015 | Fleischman et al. | |
| 9,257,122 | B1 * | 2/2016 | Cancro | G10L 17/26 |
| 9,336,268 | B1 * | 5/2016 | Moudy | G06F 40/30 |
| 10,594,757 | B1 * | 3/2020 | Shevchenko | G06F 40/20 |
| 2005/0084232 | A1 * | 4/2005 | Herberger | G11B 27/34 386/282 |
| 2013/0204664 | A1 * | 8/2013 | Romagnolo | G06Q 30/0203 705/7.32 |
| 2014/0223462 | A1 * | 8/2014 | Aimone | G06F 3/015 725/10 |
| 2015/0020086 | A1 * | 1/2015 | Chen | H04H 60/46 725/12 |
| 2015/0099946 | A1 * | 4/2015 | Sahin | A61B 7/04 600/301 |
| 2015/0223731 | A1 * | 8/2015 | Sahin | A61B 5/16 600/595 |
| 2016/0042648 | A1 * | 2/2016 | Kothuri | A63F 13/92 434/236 |
| 2016/0049094 | A1 * | 2/2016 | Gupta | G09B 9/00 434/185 |
| 2017/0201779 | A1 * | 7/2017 | Publicover | H04N 21/25883 |
| 2018/0018507 | A1 * | 1/2018 | Chetlur | G06V 40/176 |
| 2018/0137425 | A1 * | 5/2018 | D'Alo' | G06N 5/04 |
| 2018/0165696 | A1 * | 6/2018 | Bessen | G06F 40/279 |
| 2019/0349212 | A1 * | 11/2019 | Heins | H04L 12/1831 |

OTHER PUBLICATIONS

International Search Report and the Written Opinion dated Oct. 17, 2019 From the International Searching Authority Re. Application No. PCT/IB2019/056714. (12 Pages).

* cited by examiner

REAL TIME SYNCHRONIZATION OF CLIENT DEVICE ACTIONS WITH PRESENTED CONTENT

RELATED APPLICATION(S)

This application claims the benefit of priority under 35 USC § 119(e) of U.S. Provisional Patent Application No. 62/716,387 filed on Aug. 9, 2018, the contents of which are incorporated by reference as if fully set forth herein in their entirety.

FIELD AND BACKGROUND OF THE INVENTION

The present invention, in some embodiments thereof, relates to calculating feedback parameters for feedback submitted by spectators during a presentation session and, more particularly, but not exclusively, to calculating feedback parameters for feedback submitted by spectators during a presentation session by temporally correlating between presentation images and feedback messages received from client devices used by the spectators.

Presentation sessions in which content is presented on centralized display(s) to an audience are commonly conducted for a plurality of needs, audiences and/or objectives. Such presentation sessions may include, for example, lessons, lectures, training sessions, presentations and/or the like in which content is presented to a multitude of spectators, for example, students, pupils, trainees, participants and/or the like.

Active participation and involvement of the participants in the presentation session in the form of feedback to the presented content may prove to be highly desirable in order to analyze, evaluate and/or assess the involvement comprehension and/or response of the participants to the presented content. The feedback may be further analyzed to derive additional insights, for example, effectivity, suitability, clarity and/or the like of presentation sessions, presented content, presenters conducting the presentation sessions and/or the like.

SUMMARY OF THE INVENTION

According to a first aspect of the present invention there is provided a computer implemented method of calculating feedback parameters for presentation images presented to spectators, comprising:
  Obtaining a presentation stream comprising a sequence of a plurality of presentation images.
  Analyzing the presentation stream to identify a plurality of presentation periods of a presentation session. During each of the plurality of presentation periods an associated one of the plurality of presentation images is presented to one or more spectators.
  Receiving via a network, a plurality of feedback messages transmitted by one or more client devices used by one or more of the spectators to provide a feedback to one or more of the plurality of presentation images.
  Correlating each of the plurality of feedback messages with one of the plurality of presentation images according to a presentation period of the plurality of presentation periods during which each feedback message is received.
  Transmitting the plurality of correlated feedback messages to one or more feedback analysis systems adapted to calculate one or more feedback parameters for one or more of the presentation images based on the feedback extracted from one or more of the plurality of feedback messages correlated with one or more of the presentation images.

According to a first aspect of the present invention there is provided a system for calculating feedback parameters for presentation images presented to spectators, comprising a program store storing a code and one or more processors coupled to the program store is adapted to execute the stored code, the code comprising:
  Code instructions to obtain a presentation stream comprising a sequence of a plurality of presentation images.
  Code instructions to analyze the presentation stream to identify a plurality of presentation periods of a presentation session. During each of the plurality of presentation periods an associated one of the plurality of presentation images is presented to one or more spectators.
  Code instructions to receive via a network, a plurality of feedback messages transmitted by one or more client devices used by one or more of the spectators to provide a feedback to one or more of the plurality of presentation images.
  Code instructions to correlate each of the plurality of feedback messages with one of the plurality of presentation images according to a presentation period of the plurality of presentation periods during which each feedback message is received.
  Code instructions to transmit the plurality of correlated feedback messages to one or more feedback analysis systems adapted to calculate one or more feedback parameters for one or more of the presentation images based on the feedback extracted from one or more of the plurality of feedback messages correlated with one or more of the presentation images.

The real-time feedback collection and analysis system and method are agnostic to the content of the presentation stream and the presentation images and may therefore be used for practically any presentation content presented to any group of spectators and allowing the spectators to provide feedback to the presented content. Moreover, the feedback provided by the spectators is correlated with the specific presentation images with the need to deploy a complex synchronization system for synchronizing between the presented content and the client devices used by the spectators thus significantly reducing the system complexity, cost and/or the like. Avoiding the use of specifically deployed synchronized clients devices which may be significantly limited in number may also allow for practically unlimited number of spectators to provide their feedback. Furthermore, the feedback provided by the spectators may be correlated with specific presentation image(s) to support a focused analysis of the feedback with respect to specific presentation image(s). In addition, the feedback may be processed in real-time during the presentation session thus supporting the presenter in monitoring and evaluating in real-time the response and engagement of the spectators with the presented content.

In a further implementation form of the first and/or second aspects, the feedback comprising one or more of: a content feedback to a content of the one or more presentation image and an emotional feedback indicative of a state of mind of the respective spectator. Collecting and analyzing both content related feedback as well as emotional feedback may allow the presenter to assess and evaluate comprehension (understanding) and/or state of mind of one or more of the spectator(s).

In an optional implementation form of the first and/or second aspects, one or more of the plurality of feedback messages is transmitted by the one or more client devices in response to one or more feedback requests transmitted to the one or more client devices during one or more of the plurality of presentation periods. This may allow encouraging, motivating and/or soliciting the spectator(s) to provide their feedback and increase their involvement in the presentation session, in particular in case the spectators are reluctant to provide such feedback on their own initiative.

In a further implementation form of the first and/or second aspects, one or more of the feedback requests are transmitted according to one or more feedback request indication embedded within the presentation stream. The presentation stream may be constructed in advance to include initiate feedback requests to provide feedback to specific content presented in one or more of the presentation images.

In a further implementation form of the first and/or second aspects, one or more of the feedback requests are transmitted in response to an instruction received from a client device used by a presenter conducting the presentation session. This may allow the presenter to encourage, motivate and/or solicit the spectator(s) to provide their feedback and increase their involvement in the presentation session, in particular in case the spectators are reluctant to provide such feedback on their own initiative.

In a further implementation form of the first and/or second aspects, one or more of the feedback requests are automatically generated in case an involvement score calculated for one or more of the spectators is lower than a predefined threshold. The involvement score calculated based on one or more of the feedback parameters is indicative of an involvement level of the respective spectator. Automatically encouraging, motivating and/or soliciting the spectator(s) to provide their feedback may significantly improve the involvement level of the spectator(s) in the presentation session.

In an optional implementation form of the first and/or second aspects, one or more of the plurality of presentation periods are adjusted in real-time according to a reception rate of at least some of the plurality of feedback messages. This may allow adapting the presentation session to the audience, i.e. to the spectator(s) based on the feedback activity expressing the involvement level of the spectator(s).

In a further implementation form of the first and/or second aspects, the feedback parameters comprise an involvement score indicative of an involvement level of one or more of the spectators expressed by a count of feedback messages initiated by the one or more spectator, a content score indicative of understanding of one or more of the spectators of a content presented by one or more of the presentation images, and/or an emotional score indicative of a state of mind of one or more of the spectators during presentation of one or more of the presentation images. Identifying such feedback parameters may allow assessment and evaluation of involvement, comprehension (understanding) and/or state of mind of the spectator(s) either automatically as well as by the presenter.

In an optional implementation form of the first and/or second aspects, one or more of the plurality of presentation periods are adjusted in real-time according to one or more of the feedback parameters. This may allow adapting the presentation session to the audience, i.e. to the spectators based on the feedback parameter(s), specifically according to aggregated feedback parameter(s), for example, the involvement score, the content score and/or the emotional score.

In an optional implementation form of the first and/or second aspects, one or more of the feedback analysis systems are adapted to generate one or more alerts to a client device used by a presenter conducting the presentation session. One or more of the alerts are generated based on the one or more feedback parameter according to one or more predefined feedback activity rule. Alerting the presenter to inform him of the feedback parameters may allow the presenter to closely monitor in real-time the engagement, involvement and/or response of the spectator(s) to the presented content.

In an optional implementation form of the first and/or second aspects, one or more of the feedback analysis systems are adapted to generate one or more of the alerts prioritized according to priorities defined based on the one or more of:

The one or more feedback parameter identified for one or more of the spectators during one or more previous presentation sessions attended by one or more of the spectators.

One or more feedback classification rule.

Using the history of the spectator(s) and/or the classification rules of the feedback parameter(s) optionally with respect to specific spectator(s) or spectator group(s) may allow optimizing a number of alerts, type of alerts and/or the like generated to the presenter to prevent overloading the presenter with alerts while allowing the presenter to receive important, selected and/or predefined alerts.

In an optional implementation form of the first and/or second aspects, one or more of the feedback analysis systems are adapted to generate a spectator feedback report for the one or more spectator based on the one or more feedback parameter calculated for a plurality of feedback events in which the one or more spectator provided feedback during the presentation session. Generating the report which may further be a timeline-based report may allow tracking the feedback activity of the spectator(s) during the presentation session to derive insights on the engagement, involvement and/or response of the spectator(s) to the presented content.

In an optional implementation form of the first and/or second aspects, one or more of the feedback analysis systems are adapted to adjust the spectator feedback report according to the one or more feedback parameter calculated for the one or more spectator during a plurality of previous presentation sessions attended by the one or more spectator. Adjusting the report for a certain spectator(s) over a plurality of presentation sessions may allow identifying patterns and further insights on the engagement, involvement and/or response of the spectator(s).

In an optional implementation form of the first and/or second aspects, one or more of the feedback analysis systems are adapted to generate a presenter feedback report for a presenter conducting the presentation session based on the one or more feedback parameter calculated for a plurality of feedback events in which the one or more spectator provided feedback during the presentation session. Generating the report which may further be a timeline-based report may allow deriving insights on the presentation skills of the presenter.

In an optional implementation form of the first and/or second aspects, one or more of the feedback analysis systems are adapted to adjust the presenter feedback report according to the one or more feedback parameter calculated for a plurality of previous presentation sessions conducted by the presenter. Adjusting the report for the presenter over a plurality of presentation sessions may allow identifying patterns and further insights on the presentation skills of the presenter.

In an optional implementation form of the first and/or second aspects, one or more of the feedback analysis systems are adapted to generate one or more feedback analytics for one or more aggregated feedback parameter created by aggregating the one or more parameter calculated for a plurality of spectators attending the presentation session. Aggregating the feedback parameters for the plurality of spectators may allow identifying patterns and further insights on the presented content, on the presentation session, on the presentation skills of the presenter and/or the like.

In an optional implementation form of the first and/or second aspects, one or more of the feedback analysis systems are adapted to apply one or more machine learning algorithm to the one or more feedback analytics generated for the presentation stream during a plurality of presentation sessions to identify one or more feedback patterns for one or more of the presentation images. Identifying the feedback patterns may allow deriving further insights on the spectator(s), on the presented content, on the presentation session, on the presentation skills of the presenter and/or the like In an optional implementation form of the first and/or second aspects, one or more of the feedback analysis systems are adapted to generate one or more recommendations for adjusting one or more presentation elements of the one or more presentation images based on analysis of one or more of the feedback patterns. Generating the recommendations for adjusting the presented content, specifically as presented by specific presentation images based on the calculated feedback parameter(s) may allow improving the presented content to improve the engagement, involvement, understanding and/or response of the spectator(s) to the presented content.

In an optional implementation form of the first and/or second aspects, one or more of the feedback analysis systems are integrated with a feedback receiver receiving the feedback messages from the client device(s) used by the spectator(s) to provide feedback. Integrating the feedback analysis system(s) in the receiver deployed in the location where the presentation session takes place may allow significantly improving the real-time analysis of the collected feedback since the communication time between the feedback receiver and the feedback analysis system(s) may be significantly reduced compared to communication with remote feedback analysis system(s).

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWING(S)

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

DESCRIPTION OF SPECIFIC EMBODIMENTS OF THE INVENTION

Figure 1:
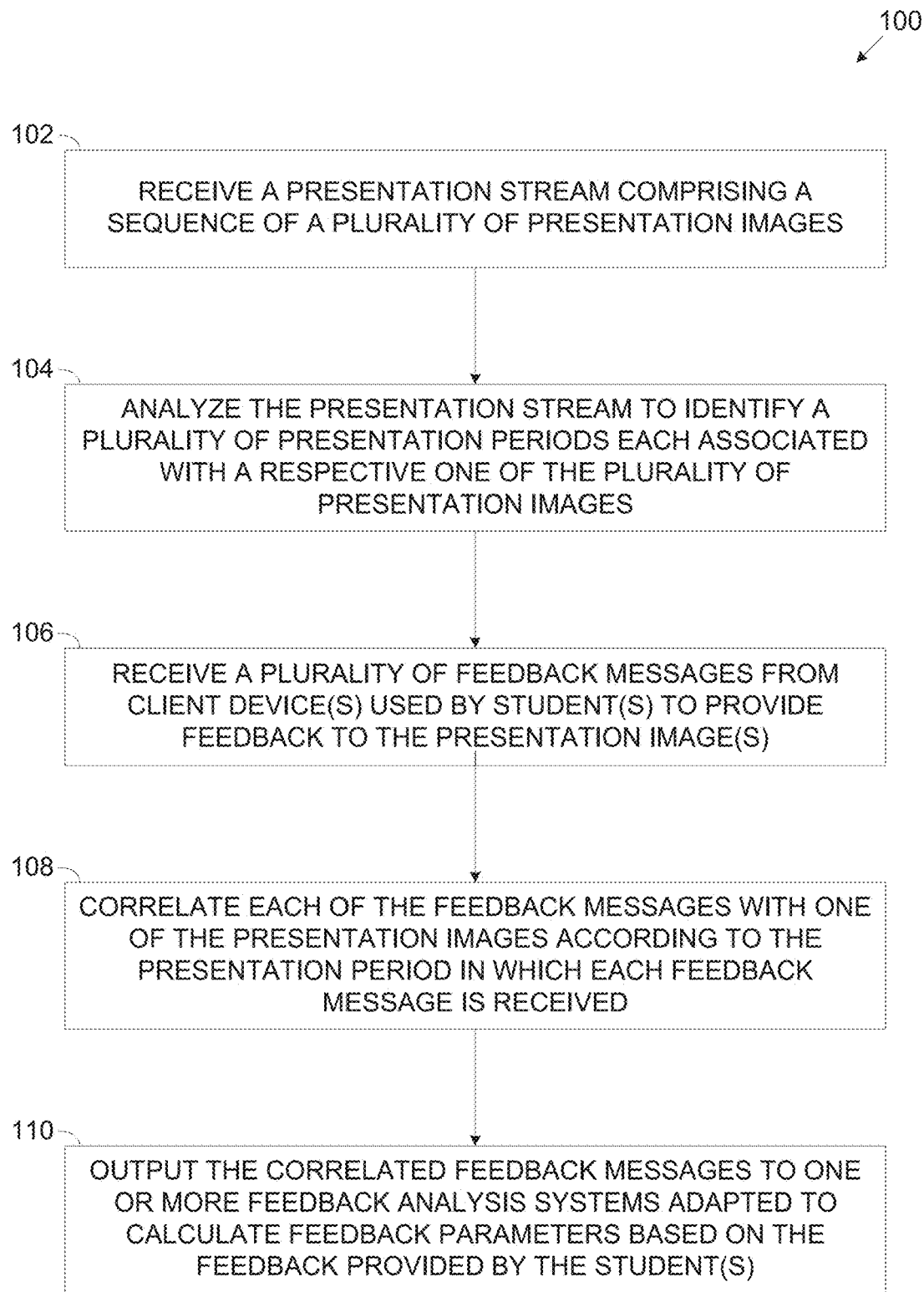
FIG. 1 is a flowchart of an exemplary process of calculating feedback parameters submitted by spectators during a presentation session, according to some embodiments of the present invention.

The present invention, in some embodiments thereof, relates to calculating feedback parameters for feedback submitted by spectators during a presentation session and, more particularly, but not exclusively, to calculating feedback parameters for feedback submitted by spectators during a presentation session by temporally correlating between presentation images and feedback messages received from client devices used by the spectators.

According to some embodiments of the present invention, there are provided methods, systems and computer program products for communicating with one or more client devices used by one or more spectators attending a presentation session for submitting feedback for a presentation stream presented to them and calculating one or more feedback parameters based on analysis of the submitted feedback.

During the presentation session, for example, a lesson, a lecture, a training session, a corporate/marketing/business/ etc. presentation and/or the like conducted by a presenter (e.g. a teacher, a lecturer, an instructor, a supervisor, an examiner, etc.) the presentation stream is presented to one or more spectators, for example, a student, a pupil, a trainee, a lecture participant, an employee and/or the like by one or more displays, for example, a projector, a screen and/or the like. The presentation stream, for example, a slides presentation (e.g. a PowerPoint presentation, etc.), an images sequence, a video stream and/or the like may comprise a sequence of presentation images, for example, presentation slides, still images, video frames and/or the like.

One or more of the spectators may typically have a client device, for example, a desktop computer, a laptop computer, a workstation, a mobile device, a Smartphone, a tablet, a smart watch and/or the like which may be used by the spectator(s) to provide feedback for one or more of the presentation images. However, the client device(s) of the spectator(s) are independent and separated from the projection system presenting the presentation stream and the client device(s) having no access to the presentation stream and are therefore not synchronized with the presentation stream, specifically with the presentation images.

In order to enable the spectator(s) to provide feedback to one or more of the presentation images using their client device(s) a feedback receiver is deployed to receive feedback messages from the client device(s) and correlate between the received feedback messages and the presentation image(s) for which the spectator(s) provided the feedback. The feedback may include, for example, content feedback relating to a content of one or more of the presentation images, emotional feedback indicative of a state of mind of the respective spectator and/or the like. During each feedback event in which a spectator uses his client device to provide feedback, the client device may transmit to the feedback receiver one or more feedback messages comprising the feedback provided (inserted) by the spectator.

The feedback receiver which may operate the display(s) to present the presentation stream may therefore analyze the presentation stream to identify a presentation period for each of the presentation images, i.e. the presentation period during which the presentation image is presented by the display(s). The feedback receiver may identify the presentation periods based on, for example, data extracted from the presentation stream (e.g. metadata, structure, layout, etc.). In another example, the feedback receiver may analyze the content of the presentation images to detect transitions between presentation images and assign each of the presentation images with a respective presentation time period.

The feedback receiver may therefore correlate each received feedback message with the respective presentation image according to the presentation period in which the feedback message is received. This means that all feedback messages received during a certain presentation period are correlated with the presentation image associated with the certain presentation period, i.e. the presentation image presented during the certain presentation period.

The feedback receiver may provide, forward, output and/ or transmit the correlated feedback messages in real-time to one or more feedback analysis systems adapted to calculate one or more feedback parameters for one or more of the presentation images. The feedback analysis system(s) may calculate the feedback parameter(s) based on the feedback provided by the spectator(s) as extracted from the feedback messages. The feedback parameters calculated for one or more of the spectators with respect to one or more of the presentation images may include, for example, an involvement score indicative of an involvement level of the spectator in the presentation session, a content score indicative of understanding of the spectator of the content presented by the presentation images, an emotional score indicative of a state of mind of spectator during presentation of the presentation images and/or the like.

Optionally, one or more of the feedback analysis systems is integrated in the feedback receiver.

The feedback parameter(s) may be provided in real-time, for example, transmitted, delivered and/or stored in an accessible storage to the presenter, specifically to a client device used by the presenter.

Optionally, one or more feedback requests are sent in real-time to one or more of the spectator(s), specifically to the client device(s) of the spectator(s). The feedback requests may be generated automatically based on one or more of the feedback parameters. For example, in case the involvement score calculated for one or more of the spectators indicates a low involvement level, a feedback request may be sent to one or more spectators failing to provide feedback. In another example, one or more feedback requests may be transmitted to one or more of the spectators in response to an instruction issued by the presenter soliciting the spectator(s) to provide feedback.

Optionally, one or more alerts are transmitted to the presenter during the presentation session based on analysis of the feedback parameter(s) with respect to one or more feedback activity rules. For example, an alert may be sent in case the emotional score calculated for one or more of the spectators indicates they are in poor state of mind (e.g. distracted, stressed, sad, etc.). In another example, an alert may be sent in case the content score calculated for one or more of the spectators indicates the spectator(s) failed to understand the content presented in one or more of the presentation images. In another example, an alert may be sent in case the involvement score calculated for one or more of the spectators indicates a low involvement level of the spectator(s) in the presentation session.

One or more of the feedback parameters may be further analyzed to generate one or more feedback record for one or more of the spectators attending the pretention session, for the presenter conducting the presentation session, for the presentation session, for the presentation stream, for one or more of the presentation images and/or the like. The feedback records may include the feedback provided during the feedback events, the calculated feedback parameter(s) and the presentation image correlated with the feedback event.

Moreover, one or more analytics reports may be generated based on aggregated feedback parameter(s) generated by, for example, aggregating the feedback parameter(s) calculated for certain spectator(s) over a plurality of presentation sessions, aggregating the feedback parameter(s) calculated for a plurality of spectator(s) for a certain presentation session, aggregating the feedback parameter(s) calculated for a plurality of spectator(s) over a plurality of presentation sessions and/or the like.

The real-time feedback collection and analysis may present significant advantages compared to existing methods and systems for collecting feedback and analyzing it to produce feedback parameters, indicators and/or the like. Some of the currently existing may utilize questioners either hard copy and/or digital forms to collect the feedback from the spectators after the presentation session has ended. Such post session feedback may naturally not target specific presentation images but rather the entire presentation stream. Moreover analyzing the post session feedback may be done off-line and it is therefore impossible to provide real-time feedback parameters and/or indicators to the presenter. The real-time feedback collection and analysis on the other hand allows correlation of the feedback provided by the spectators with specific presentation image(s) to support a focused analysis on the specific presentation image(s). Moreover, the real-time feedback collection and analysis system provides the presenter with the feedback parameters in real-time during the presentation session thus supporting the presenter in monitoring and evaluating in real-time involvement, comprehension (understanding) and/or state of mind of one or more of the spectators. Furthermore, the presenter may monitor and evaluate the involvement, the comprehension and/or the state of mind of the spectator(s) with respect to one or more specific presentation images.

Some existing feedback collection and analysis methods and systems may utilize complex systems in which the client devices used by the spectators and the presenter are synchronized with the presented presentation stream. This may allow real-time collection and correlation of the feedback provided by the spectators with the presented content. However, such complex systems may be include costly components and may require complex and expensive deployment. Moreover, these systems may be limited in the number of spectators that may actively participate (i.e. provide feedback) during the presentation session since the number of connected client devices may be limited. This is in contrast to the real-time feedback collection and analysis system which requires a simple deployment of the feedback receiver and non-synchronized thus significantly reducing the deployment cost of the system. Moreover, the real-time feedback collection and analysis system may take advantage of client devices which are typically available to the spectators such as, Smartphones, laptops, etc. thus further reducing the system complexity and/or cost. In addition, the number of spectators who may actively participate in the presentation session may be unlimited since there is no need to use pre-installed, pre-configured and/or specially adapted client devices.

Moreover, the real-time feedback collection and analysis system is agnostic to the content of the presentation streams and the presentation images and may therefore be used for practically any presentation content presented to any group of spectators and allowing the spectators to provide feedback to the presented content.

Furthermore, targeting the specific presentation images, the specific spectators and/or the like, in particular over multiple presentation sessions as done by the real-time feedback collection and analysis system may allow generating highly accurate and effective feedback records and/or analytics reports. These accurate feedback records and/or analytics reports may be used to evaluate a plurality of aspects, for example, efficiency of presentation sessions, efficiency of presentation streams, suitability of presentation streams for spectator groups, efficiency/suitability of specific presentation images, teaching skills of presenters and/or the like.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable storage medium can be a tangible device that can retain and store instructions for use by an instruction execution device. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer Program code comprising computer readable program instructions embodied on a computer readable medium may be transmitted using any appropriate medium, including but not limited to wireless, wire line, optical fiber cable, RF, etc., or any suitable combination of the foregoing.

The program code for carrying out operations for aspects of the present invention may be written in any combination of one or more programming languages, including an object oriented programming language such as Java, Smalltalk, C++ or the like and conventional procedural programming languages, such as the "C" programming language or similar programming languages.

The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). The program code can be downloaded to respective computing/processing devices from a computer readable storage medium or to an external computer or external storage device via a network, for example, the Internet, a local area network, a wide area network and/or a wireless network.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to the drawings, FIG. 1 illustrates a flowchart of an exemplary process of calculating feedback parameters submitted by spectators during a presentation session, according to some embodiments of the present invention. An exemplary process 100 may be executed by a feedback receiver communicating with one or more client devices associated with one or more spectators attending a presentation session and presented with a presentation stream comprising a sequence of presentation images, for example, presentation slides, still images, video frames and/or the like.

During the presentation session, for example, a lesson, a lecture, a training session, a corporate/marketing/business/ etc. presentation and/or the like one or more of the spectators (e.g. students, pupils, trainees, lecture participants, employees, etc.) may use their associated client devices to provide a feedback for one or more of the presentation images. The feedback may include, for example, content feedback relating to a content of one or more of the presentation images, emotional feedback indicative of a state of mind of the respective spectator and/or the like. The client device(s) used by the spectator(s) may transmit to the feedback receiver one or more feedback messages comprising the feedback provided by the spectator(s).

The client device(s) do not have access to the presented presentation stream and are therefore not synchronized with the presentation stream. The feedback receiver may therefore temporally correlate between each of a plurality of feedback messages received from the client device(s) with a respective one of the presentation images for which the spectator(s) provided his feedback. The feedback receiver may correlate the feedback messages with the presentation images based on the timing of reception of each of the feedback messages.

The feedback receiver controlling the presentation of the presentation stream may analyze the presentation stream to identify a presentation period for each of the presentation images, i.e. the presentation period during which the presentation image is presented to the spectators. The feedback receiver may then correlate each feedback message with the respective presentation image according to the presentation period in which the feedback message is received. This means that all feedback messages received during a certain presentation period are correlated with a presentation image presented during the certain presentation period.

The correlated feedback messages may be forwarded to one or more feedback analysis systems adapted to calculate one or more feedback parameters for one or more of the presentation images based on the feedback provided by the spectator(s) as extracted from the feedback messages. The feedback parameters may be further analyzed to generate analytics data for the spectator(s) attending the pretention session, for a presenter (e.g. a teacher, a lecturer, an instructor, a supervisor, an examiner, etc.) conducting the presentation session, for the presentation stream, for one or more of the presentation images and/or the like.

Figure 2:
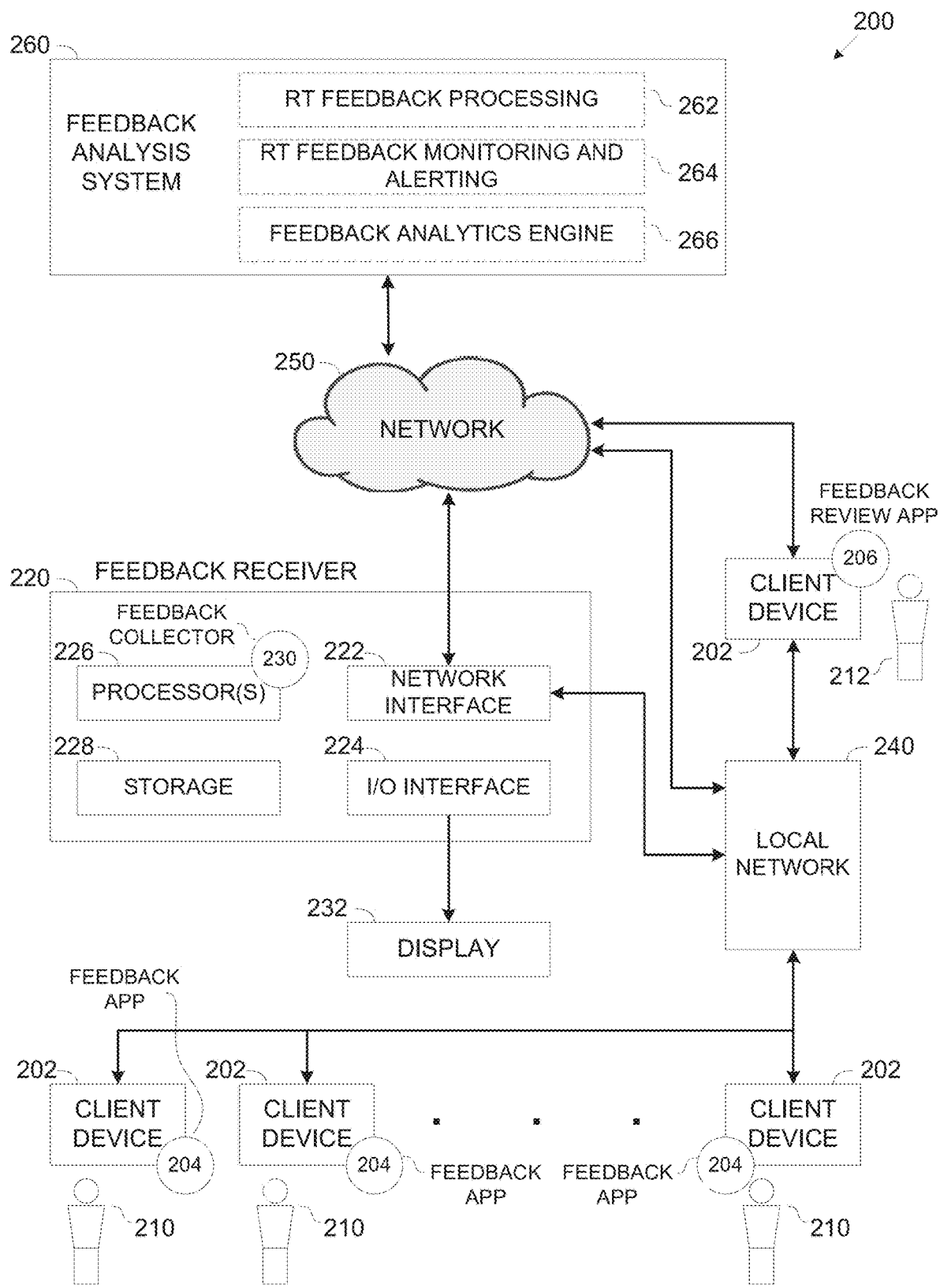
FIG. 2 is a schematic illustration of an exemplary system for calculating feedback parameters submitted by spectators during a presentation session, according to some embodiments of the present invention.

Reference is also made to FIG. 2, which is a schematic illustration of an exemplary system for calculating feedback parameters submitted by spectators during a presentation session, according to some embodiments of the present invention. An exemplary system 200 for executing a process such as the process 100 includes a feedback receiver 220 controlling a presentation of a presentation stream to one or more spectators 210 associated with one or more client devices 202 during a presentation session conducted by a presenter 212 associated with another client device 202. The client devices 202 may include, for example, a desktop computer, a laptop computer, a workstation, a mobile device, a Smartphone, a tablet, a smart watch and/or the like.

The presentation session may typically be conducted in a presentation location, for example, a class room, a lecture hall and/or the like where the presenter 212 and the spectator(s) 210 are located at the same geographical location and the presentation stream is presented to the spectator(s) 210 by one or more displays 232, for example, a projector, a screen and/or the like. While a single display 232 is described herein after, this should not be construed as limiting since multiple displays 232 may be deployed in the presentation location to present the same presentation stream to the spectator(s) 210 during the presentation session.

The client devices 202 may include one or more communication interfaces to connect to a local network 240 comprising one or more wired and/or wireless networks, for example, a Local Area Network (LAN), a Wireless LAN (WLAN) (e.g. Wi-Fi, etc.) and/or the like. The local network 240 may further connect to one or more global networks 250, for example, a LAN, a Wide Area Network (WAN), a Metropolitan Area Network (MAN), a cellular network, the internet and/or the like.

Each of the client devices 202 includes one or more processors (homogenous or heterogeneous) which may be arranged for parallel processing, as clusters and/or as one or more distributed core processing units. Each of the client devices 202 also includes a storage comprising one or more persistent and/or volatile storage devices, for example, a Read Only Memory (ROM), a Flash array, a Flash card, a hard drive, a Random Access Memory (RAM) component and/or the like. The processor(s) of the client devices 202 may execute one or more software modules such as, for example, a process, a script, an application, an agent, a utility, a tool and/or the like each comprising a plurality of program instructions stored in a non-transitory storage medium (program store) and executed by the processor(s). For example, the client devices 202 associated with the spectator(s) 210 may execute a feedback application (app) 204 used by the spectator(s) 210 to provide feedback for one or more of the presentation images of the presentations stream during one or more presentation sessions. The client devices 202 associated with the presenter 212 may execute a feedback review application (app) 206 used by the presenter 212 to view feedbacks provided by the spectator(s) 210 for one or more of the presentation images, receive alerts, issue feedback requests and/or the like.

The feedback receiver 220 may include a network interface 222 comprising one or more communication interfaces to connect to the local network 240 for communicating with the client devices 202 of the spectator(s) 210 and/or of the presenter 212. Through the network interface 222, the feedback receiver 220 may further connect to the network 250 for communicating with one or more feedback analysis systems 260.

The feedback receiver 220 may include an Input/Output (I/O) interface 224 comprising one or more I/O interfaces, for example, a high Definition Multimedia Interface (HDMI) interface, a Universal Serial Bus (USB) interface, a serial interface and/or the like. Via the I/O interface 224, the feedback receiver 220 may connect to one or more peripheral devices, for example, the display 232, a local display, a mobile storage device (e.g. a USB memory device, etc.), a user interface device (e.g. a keyboard, a pointing device, a touch screen, etc.) and/or the like.

The feedback receiver 220 may include one or more processors 226 (homogenous or heterogeneous) which may be arranged for parallel processing, as clusters and/or as one or more distributed core processing units. The feedback receiver 220 also includes a storage 228 comprising one or persistent and/or volatile storage devices, for example, a Read Only Memory (ROM), a Flash array, a Flash card, a hard drive, a Random Access Memory (RAM) component and/or the like. The processor(s) 226 may execute one or more software modules such as, for example, a process, a script, an application, an agent, a utility, a tool and/or the like each comprising a plurality of program instructions stored in a non-transitory storage medium (program store) such as the storage 228 and executed by a processor such as the processor(s) 226. For example, the processor(s) 226 may execute a feedback collector application 230 for collecting feedback messages transmitted by the client device(s) 202 of the spectator(s) 210, to analyze the presentation stream, for communicating with the feedback analysis system(s) 260 and/or the like. The feedback collector 230 may further utilize one or more hardware elements, for example, a circuit, a component, an Integrated Circuit (IC), an Application Specific Integrated Circuit (ASIC), a Field Programmable Gate Array (FPGA), a Digital Signals Processor (DSP), a Graphic Processing Units (GPU) and/or the like.

The feedback analysis system(s) 260 may be utilized by, for example, a server, collection of servers, a computing node, cluster of computing nodes and/or the like. The feedback analysis system(s) 260 may execute one or more applications and/or provide one or more service, for example, a Real-time (RT) feedback processing application 262, a RT feedback monitoring and alerting application 264, a feedback analytics engine 266 and/or the like.

Additionally and/or alternatively, one or more of the feedback analysis systems 260, specifically, the RT feedback processing application 262, the RT feedback monitoring and the alerting application 264 and/or the feedback analytics engine 266 are implemented as one or more cloud computing services, for example, an Infrastructure as a Service (IaaS), a Platform as a Service (PaaS), a Software as a Service (SaaS) and/or the like such as, for example, Amazon Web Service (AWS), Google Cloud, Microsoft Azure and/or the like.

Optionally, one or more of the feedback analysis systems 260 and/or part thereof, specifically, the RT feedback processing application 262, the RT feedback monitoring and the alerting application 264 and/or the feedback analytics engine 266 are utilized in the feedback receiver 220 and executed by the processor(s) 226.

As shown at 102, the process 100 starts with the feedback collector 230 obtaining a presentation stream, for example, a slides presentation (e.g. a PowerPoint presentation, etc.), an images sequence, a video stream and/or the like comprising a plurality of presentation images, for example, a slide, a picture, an image, a capture and/or the like.

For example, the presentation stream may be a file stored in storage such as the storage 228 and the feedback collector 230 may therefore retrieve the presentation stream from the storage 228. In another example, the feedback collector 230 may retrieve the presentation stream from one or more peripheral devices connected to the I/O interface 224, for example, a memory card, a USB device and/or the like. In another example, the feedback collector 230 may communicate with one or more remote storage resources, for example, a storage server, a network storage device, cloud storage and/or the like to retrieve the presentation stream from the remote networked resource(s). In another example, the feedback collector 230 may communicate with one or more of the client devices 202, specifically the client device 202 associated with the presenter 212 to receive the presentation stream. In another example, the feedback collector 230 may communicate with one or more remote networked resources, for example, a server, a network device, a cloud service and/or the like streaming the presentation stream to the feedback collector 230.

During the presentation session, for example, a lesson, a lecture, a training session and/or the like the display 232 is operated to present the presentation stream to the spectator(s) 210. The feedback collector 230 may directly operate the display 232 to present the presentation stream. For example, the feedback collector 230 may drive the presentation stream via the I/O interface 224 to the display 232. Optionally, while the feedback collector 230 may not directly operate the display 232 to present the presentation stream, the feedback collector 230 may monitor the presentation of the presentation stream presented by the display 232 during the presentation session. For example, the client device 202 associated with the presenter 212 may simultaneously transmit the presentation stream over the network 240 to both the display 232 and to the feedback receiver 220. As such the feedback collector 230 may monitor the presentation of the presentation stream presented by the display 232.

As shown at 104, the feedback collector 230 may analyze the presentation stream to identify a plurality of presentation periods each associated with a respective one of the plurality of presentation images to express the presentation time period during which the respective presentation image is presented by the display 232 to the spectator(s) 210. The presentation periods may be fixed and equal for at least some of the presentation images or the presentation period for presenting each of the presentation images may be different. For example, the presenter 212 using his client device 202 may control the duration of the presentation period of one or more of the presentation images during the presentation session.

The feedback collector 230 may identify the presentation periods by applying one or more analyses at one or more levels of the presentation stream. For example, the feedback collector 230 may analyze a structure, a layout and/or a metadata (e.g. timestamp, etc.) of the presentation stream and/or of the presentation images to extract and/or identify the presentation periods assigned to one or more of the presentation images. In another example, the feedback collector 230 may analyze the content of the video presentation to identify one or more of the presentation images and associate one or more of the presentation images with a respective presentation period calculated based on a local clock source available in the feedback receiver 220, for example, a clock application, a clock service, a clock circuit, a counter and/or the like. In another example, the feedback collector 230 may analyze the video signal driven via the I/O interface 224, for example, the HDMI port(s) to detect the switching of the presentation images and associate one or more of the presentation images with a respective presentation period calculated based on the local clock source available in the feedback receiver 220.

During the presentation session, one or more of the spectators 210 watching the presentation images presented by the display 232 may provide feedback for the one or more of the presentation images. The feedback provided (inserted) by the spectator(s) 210 may include, for example, content (intellectual) feedback relating to a content of one or more of the presentation images, emotional feedback indicative of a state of mind of the respective spectator and/or the like.

Each of the spectator(s) 210 may use his associated client device 202, specifically the feedback app 204 executed by the client device 202 to provide his feedback for the presentation image(s). It is emphasized that while the spectator(s) 210 may operate the feedback app 204 to provide the feedback for the presentation image currently presented by the display 232, the feedback app 204 is independent, separated and not synchronized with the presentation stream. In response to each feedback event in which a certain spectator 210 operates the feedback app 204 to provide his feedback for a currently presented presentation image, the feedback app 204 may transmit, via the network 240, a feedback message to the feedback collector 230.

Figure 3:
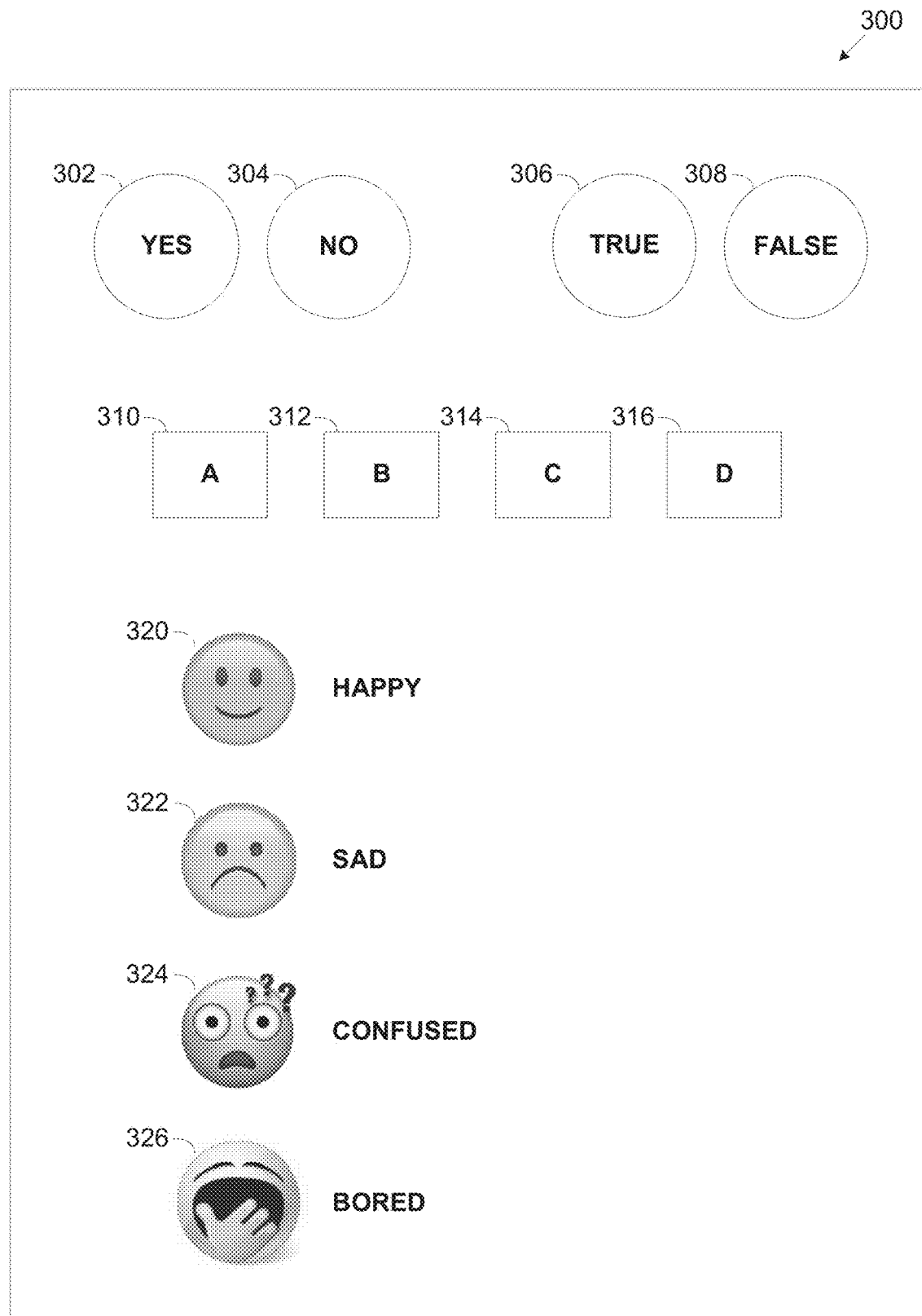
FIG. 3 is a screen capture of an exemplary feedback application used for providing feedback during a presentation session, according to some embodiments of the present invention.

Reference is now made to FIG. 3, which is a screen capture of an exemplary feedback application used for providing feedback during a presentation session, according to some embodiments of the present invention. An exemplary screen capture 300 of an exemplary feedback app such as the feedback app 204 may include a plurality of visual elements, for example, an icon, a symbol, a label, an indication and/or the like which may be displayed by a display of a client device such as the client device 202.

A spectator such as the spectator 210 may operate the client device to interact with the feedback app 204 to select one or more of the visual elements. For example, the display of the client device 202 may be a touchscreen allowing the spectator 210 to select one or more of the visual elements. In another example, the spectator 210 may operate one or more user input interfaces of his associated client device 202, for example, a keyboard, a pointing device and/or the like to select one or more of the visual elements. In another example, the spectator 210 may operate one or more audio input interfaces of his associated client device 202, for example, a microphone and/or the like to indicate selection of one or more of the visual elements.

In response to each feedback event in which a certain spectator 210 selects a certain visual element, the feedback app 204 may generate a feedback message comprising data indicative of the selected visual element.

The visual elements may include content related elements which may be used by the spectator(s) 210 to input content feedback relating to the content of one or more of the presentation images. For example, the visual elements may include a YES symbol 302, a NO symbol 304, a TRUE symbol 306 and a FALSE symbol 308. This may allow one or more spectators 210 to respond with an answer to one or more questions presented in one of more of the presentation images, specifically YES/NO questions, TRUE/FALSE questions and/or the like. In another example, the visual elements may include an A selection symbol 310, a B selection symbol 312, a C selection symbol 314 and a D selection symbol 316. This may allow one or more spectators 210 to respond with an answer to one or more questions presented in one of more of the presentation images, specifically multi choice questions having, for example, four possible answers presented in the presentation image(s) with correlation to the respective question and each marked with a letter A, B, C and D.

The visual elements may also include emotion elements which may be used by the spectator(s) 210 to input emotional feedback indicative of a state of mind of the respective spectator 210 and/or the like. For example, the visual elements may include one or more state of mind (mood) icons such as, for example, happy, sad, confused and/or bored. This may allow one or more spectators 210 to report their current state of mind by selecting the mood icons accordingly.

Reference is made once again to FIG. 1.

As shown in 106, during the presentation session the feedback collector 230 may receive one or more feedback messages from the client device(s) 202 used by one or more of the spectators 210 to provide their feedback for the one or more of the presentation images.

Optionally, the feedback collector 230 transmits one or more feedback requests to the client device(s) 202 of one or more of the spectators 210 requesting the spectator(s) 210 to provide feedback. For example, the feedback collector 230 may transmit one or more feedback requests according to one or more feedback request indications embedded within the presentation stream. The feedback request indication(s) may be defined by a constructor of the presentation stream for one or more of the presentation images to solicit the spectator(s) 210 to provide feedback for these presentation image(s). In another example, the feedback collector 230 may transmit one or more feedback requests in response to an RT request received from the client device 202 of the presenter 212 using the feedback review app 206 to issue the request for feedback. The RT request may be directed to certain spectator(s) 210 and/or to all of the spectators 210.

Optionally, the feedback collector 230 adjusts in real-time the presentation period associated with one or more of the perennation images according to a reception rate of at least some of the plurality of feedback messages. For example, in case the feedback collector 230 determines that the reception rate is high for a certain presentation image, for example, feedback messages are received from a majority of the spectators 210 (e.g. 80% of the spectators 210) at a significantly short time (e.g. 5 seconds) and/or the like, the feedback collector 230 may reduce the presentation period of the certain presentation image. In another example, assuming the feedback collector 230 determines that the reception rate is low for a certain presentation image, for example, feedback messages are not received or received from very few of the spectators 210 (e.g. 5% of the spectators 210), the feedback messages are received after a significantly long time after the certain presentation image is first presented (e.g. 30 seconds) and/or the like, the feedback collector 230 may increase the presentation period of the certain presentation image. This may allow adapting the presentation session to the audience, i.e. to the spectators 210 based on the feedback activity.

As shown at 108, the feedback collector 230 may temporally correlate each feedback message received from the client device(s) 202 with one of the presentation images according to a reception time of the respective feedback message with respect to the presentation period of one or more of the presentation images. Specifically, for each presentation period, the feedback collector 230 correlates every feedback message received during the respective presentation period with the currently presented presentations image, i.e. the presentation image associated with the respective presentation period.

The reception time of the received feedback messages may be determined based on one or more implementations and/or techniques and correlated accordingly with the respective presentation period(s) according to the timing of the presentation periods. For example, the feedback collector 230 may determine the reception time based on the local clock source available in the feedback receiver 220. In another example, the feedback collector 230 may determine the reception time based on a time stamp included in one or more of the feedback messages.

As shown at 110, the feedback collector 230 may provide, for example, transmit, output and/or the like the correlated feedback messages, i.e. the feedback messages coupled with their respective presentation image(s) to one or more of the feedback analysis systems 260. The feedback analysis system(s) 260, in particular, the RT feedback processing application 262, the RT feedback monitoring and the alerting application 264 and/or the feedback analytics engine 266 may be adapted to calculate one or more feedback parameters for one or more of the presentation images based on the feedback provided by the spectator(s) 210 as extracted from the correlated feedback messages.

The feedback collector 230 may provide each of the feedback messages with the respective actual presentation image the feedback message is correlated with. Optionally, the feedback collector 230 provides each feedback message with an indication to the respective presentation image the feedback message is correlated with.

The feedback parameter(s) calculated by the RT feedback processing application 262, the RT feedback monitoring and the alerting application 264 and/or the feedback analytics engine 266 for one or more of the spectators 210 with respect to one or more of the presentation images may include, for example:

An involvement score (for example, on a scale of 1-10) indicative of an involvement level of the spectator 210 expressed by a count of feedback messages initiated by the spectator 210.

A content score (for example, on a scale of 1-10) indicative of understanding of the spectator 210 of the content presented by the presentation image.

An emotional score indicative of a state of mind of the spectator 210 during presentation of the presentation image.

The RT feedback processing application 262 may process the feedback messages received from the feedback collector 230 to create and/or update one or more feedback records, for example, a file, a list, a table, a database and/or the like to include feedback information relating to the presentation session. Moreover, the RT feedback processing application 262 may process and update the feedback record(s) in real-time during the presentation session.

The RT feedback processing application 262 may further calculate one or more aggregated feedback parameters aggregating the feedback parameter(s) calculated for a plurality of the spectators 210 during the presentation session. For example, the RT feedback processing application 262 may calculate an aggregated involvement score indicating an overall involvement level of the plurality of spectators 210, for example, a percentage of spectators 210 that provided a feedback to certain one or more presentation images. In another example, the RT feedback processing application 262 may calculate an aggregated content score indicating an overall understanding level of the content of certain one or more presentation images by the plurality of spectators 210. In another example, the RT feedback processing application 262 may calculate an aggregated emotional score indicating an overall state mind of the plurality of spectators 210 during certain one or more presentation images.

The RT feedback processing application 262 may provide, for example, output, transmit and/or the like the feedback parameter(s) calculated for one or more of the spectator(s) 210. For example, the RT feedback processing application 262 may transmit the feedback parameter(s) to the presenter 212, specifically to the feedback review app 206 executed by the client device 202 used by the presenter 212. In another example, the RT monitoring and alerting application 264 may transmit the feedback parameter(s) to the feedback receiver, specifically to the feedback collector 230.

Optionally, the feedback collector 230 adjusts in real-time the presentation period associated with one or more of the perennation images according to one or more of the feedback parameter(s). For example, in case the feedback collector 230 determines, based on the aggregated involvement score feedback parameter, that feedback is provided by a majority of the spectators 210 (e.g. 80% of the spectators 210), the feedback collector 230 may reduce the presentation period of the certain presentation image. In another example, assuming the feedback collector 230 determines, based on the aggregated content score feedback parameter, that a significant number of spectators 210 failed to understand the content of one or more certain presentation image (e.g. the aggregated content score is 6), the feedback collector 230 may increase the presentation period of the certain presentation image. In another example, assuming the feedback collector 230 determines, based on the aggregated emotional score feedback parameter, that a significant number of spectators 210 is confused with respect to one or more certain presentation image (e.g. the aggregated emotional score is "confused"), the feedback collector 230 may increase the presentation period of the certain presentation image. This may allow adapting the presentation session to the audience, i.e. to the spectator(s) 210 based on the feedback activity.

The RT feedback processing application 262 may further arrange the feedback record(s) to associate the feedback messages and more specifically the feedback of the spectator(s) 210 extracted from the feedback messages with the presentation stream, with the (identity of) spectator(s) 210 who provided the feedback messages, with the (identity of)

presenter 212 and/or the like. The RT feedback processing application 262 may further construct the feedback record(s) to include additional information relating to the presentation session, for example, timing information (e.g. date, time of day, etc.), attendance information (e.g. number of spectators 210, age of spectator(s) 210, etc.), location information (e.g. physical location, etc.) and/or the like.

The RT feedback processing application 262 may store the feedback record(s) in storage accessible and/or available to other applications and/or services, specifically the RT monitoring and alerting application 264 and/or to the feedback analytics engine 266, for example, a local storage of the feedback analysis system 260, a network storage resource, cloud storage and/or the like.

Optionally, the RT feedback processing application 262 directly outputs the feedback record(s) to the RT monitoring and alerting application 264 and/or to the feedback analytics engine 266.

The RT monitoring and alerting application 264 may analyze the feedback record(s) in real-time during the presentation session to monitor the feedback activity of the spectator(s) 210 during the presentation session and calculate one or more of the feedback parameters.

The RT monitoring and alerting application 264 may compare the calculated feedback parameter(s) to one or more feedback activity rules which may be predefined, for example, by the constructor of the presentation stream, the presenter 212 and/or the like. In case the feedback parameter(s) complies (meets) with one or more of the predefined feedback activity rules, the RT monitoring and alerting application 264 may automatically generate one or more alerts to inform the presenter 212 about the feedback parameter(s). This may allow the presenter 212 to monitor and evaluate the involvement, the comprehension (understanding) and/or the state of mind of one or more of the spectators during the presentation session in general and with respect to one or more of the presentation images in particular.

For example, a certain feedback activity rule predefined for the involvement score may define that each spectator 210 should provide a content feedback for a certain presentation image. Therefore in case one or more of the spectator(s) 210 is detected to have a low involvement score, i.e. the spectator(s) 210 does not provide feedback for the certain presentation image, the RT monitoring and alerting application 264 may generate an alert to the presenter 212. In another example, a certain feedback activity rule predefined for the content score may define that a spectator 210 providing less than 60% correct answers to questions presented by the presentation image(s) is assigned a low content score. Therefore in case one or more of the spectator(s) 210 is detected to have the low content score, the RT monitoring and alerting application 264 may generate an alert to the presenter 212 to inform the presenter 212 of potential insufficient understanding of the content. In another example, a certain feedback activity rule predefined for the emotional score may define that in case one of the spectators 210 provides a "sad" emotional feedback, an alert is sent to the presenter 212 to inform the presenter 212 of potential poor state of mind. In another example, a certain feedback activity rule predefined for the emotional score may define that in case more than 10% of the spectators 210 provide a "bored" emotional feedback, an alert is sent to the presenter 212 to presenter 212 of potential inefficiency in delivery of the presentation stream.

The RT monitoring and alerting application 264 may further analyze the feedback record(s) with respect to one or more previous feedback records generated to record feedback activity during one or more previous presentation session conducted in the past. Based on the analysis, the RT monitoring and alerting application 264 may detect one or more deviations in the feedback parameter(s) calculated for one or more of the spectators 210 compared to the feedback parameter(s) calculated in the past presentation sessions as defined by one or more of the feedback activity rules. In case the feedback parameter(s) calculated for the current presentation session compared to the past feedback parameter(s) complies (meets) with one or more of the predefined feedback activity rules, the RT monitoring and alerting application 264 may generate one or more alerts to inform the presenter 212 about the detected feedback parameter(s). For example, a certain feedback activity rule predefined for the involvement score may define that in case a deviation of more than 20% in the feedback activity is detected for one or more of the spectators 210 compared to the past feedback activity of the spectator(s) 210, an alert is sent to the presenter 212.

The RT monitoring and alerting application 264 may inform the presenter 212 of the compliance of the detected feedback activity with the feedback activity rule(s) by transmitting one or more alert messages to the client device 202 of the presenter 212. The presenter 212 may take one or more actions based on the received alert message(s), for example, issue one or more RT requests to the feedback collector 230 to issue one or more feedback request(s) to one or more of the spectator(s) 210, specifically to the feedback app(s) 204 executed by the client device(s) 202 associated with the spectator(s) 210.

Optionally, the RT monitoring and alerting application 264 prioritizes the alert messages transmitted to the presenter 212. For example, the prioritization of the alerts may be done according to the comparison of the feedback parameter(s) calculated for one or more of the spectators 210 with the past feedback parameter(s). For example, assuming that based on the analysis of the feedback parameter(s) compared to the past feedback parameter(s), the RT monitoring and alerting application 264 identifies an abnormal feedback activity for one or more of the spectators 210 indicating an out of character behavior of the spectator(s) 210, the RT monitoring and alerting application 264 may assign a high priority to the alert reporting the abnormal feedback activity. In another example, the prioritization of the alerts may be done according to classification of the feedback parameter(s) defined by one or more classification rules which may be predefined by, for example, the presenter 212. For example, a certain classification rule may define that a low emotional score calculated for one or more of the spectators 210 based on, for example, "sad" feedback provided by the respective spectator(s) 210 is assigned a high priority. In another example, a certain classification rule may define that that a low involvement score calculated for one or more of the spectators 210 is assigned a low priority.

Optionally, the RT monitoring and alerting application 264 initiates automatic generation of one or more feedback requests based on the feedback parameter(s) calculated for one or more of the spectators 210, specifically based on the involvement score. The RT monitoring and alerting application 264 may initiate the automatic generation of the feedback request(s) by transmitting one or more messages to the feedback collector 230 instructing the feedback collector 230 to transmit one or more feedback requests to the client device(s) 202 of the one or more of the spectator 210. For example, assuming the involvement score calculated by the RT monitoring and alerting application 264 for one or more of the spectators 210 is less than 60%, i.e. the spectator(s) 210 failed to provide feedback to at least 60% of the requested feedback, the RT monitoring and alerting application 264 may instruct the feedback collector 230 to transmit feedback request(s) to the spectator 210 having the low involvement score.

The RT monitoring and alerting application 264 may provide, for example, output, transmit and/or the like the feedback parameter(s) calculated for one or more of the spectator(s) 210. For example, the RT monitoring and alerting application 264 may transmit the feedback parameter(s) to the presenter 212, specifically to the feedback review app 206 executed by the client device 202 used by the presenter 212. In another example, the RT monitoring and alerting application 264 may transmit the feedback parameter(s) to the feedback receiver, specifically to the feedback collector 230.

The feedback analytics engine 266 may generate one or more analytics reports based on one or more of the feedback parameters calculated by analyzing the correlated feedback messages and/or received from the RT monitoring and alerting application 264. The feedback analytics engine 266 may store one or more of the analytics reports in storage, for example, a local storage of the feedback analysis system 260, a network storage resource, cloud storage and/or the like. Optionally, the feedback analytics engine 266 transmits one or more of the analytics reports to the feedback review app 206 executed by the client device 202 of the presenter 212 to make the analytics report(s) available to the presenter 212. The feedback analytics engine 266 may also transmit one or more of the analytics reports to the feedback collector 230 which may adjust the presentation period of one or more of the presentation images accordingly.

The analytics report(s) stored in the storage may be accessible subject to appropriate access permission rights to the presenter 212 using the feedback review app 206, to the spectator(s) 210 using the feedback app 204, and/or the like. The analytics report(s) may be also available to one or more users, for example, the presenter 212 using a suitable access application, for example, a web browser, a local agent, a proprietary application and/or the like for accessing the storage and/or for communicating with one or more services, platforms, systems and/or the like controlling access to the storage. For example, the analytics report(s) may be available to the user(s) (e.g. the presenter 212, the spectator(s) 210, etc.) from one or more of the cloud computing services such as, for example, the AWS, the Google Cloud, the Microsoft Azure and/or the like.

The analytics report(s) generated by the feedback analytics engine 266 may target one or more of the spectators 210, the presenter 212, the presentation stream, specific presentation images of the presentation stream and/or the like.

For example, the feedback analytics engine 266 may generate a spectator feedback report for each of one or more of the spectators 210. The spectator feedback report may include all feedback events in which the respective spectator 210 provided feedback to one or more of the presentation images. Moreover, each of the feedback events included in the spectator feedback report may be associated with the respective correlated presentation image to which the spectator 210 provided feedback. Each of the feedback events included in the spectator feedback report may be also associated with one or more of the feedback parameters calculated for the respective feedback event. The feedback analytics engine 266 may further construct the spectator feedback report as a timeline-based report across the entire presentation session to reflect the feedback activity and feedback parameters of the spectator 210 throughout the presentation session.

The feedback analytics engine 266 may further adjust, for example, update, amend, append and/or the like the spectator feedback report of one or more of the spectators 210 to include feedback events detected in a plurality of presentation sessions. For example, assuming a certain spectator 210 is a pupil at school, the feedback analytics engine 266 may adjust the spectator feedback report of the certain spectator 210 based on feedback events collected during multiple lessons (presentation sessions) in which different presentation streams are presented to the certain spectator 210 optionally by different presenters 212.

In another example, the feedback analytics engine 266 may generate a presenter feedback report for the presenter 212. The presenter feedback report may include one or more of the feedback parameters calculated during the presentation session for one or more of the spectators 210, specifically, the involvement score, the content score, the emotional score and/or the like.

The feedback analytics engine 266 may further adjust the presenter feedback report of the presenter 212 to include aggregated feedback parameters calculated for one or more of the spectators 210 during a plurality of presentation sessions. For example, assuming the presenter 212 is a teacher at school, the feedback analytics engine 266 may adjust the presenter feedback report of the presenter 212 based on feedback parameter(s) calculated during multiple lessons (presentation sessions) conducted by presenter 212 optionally for different spectator(s) 210.

The feedback analytics engine 266 may generate one or more presentation stream analytics reports by aggregating one or more of the feedback parameter calculated for a plurality of spectators 210 attending a plurality of presentation sessions in which the presentation stream is presented.

Optionally, the feedback analytics engine 266 analyzes one more of the analytics reports to identify one or more feedback patterns for one or more of the presentation session, the presentation stream (i.e. one or more of the presentation images), the spectators 210, the presenter 212 and/or the like. Such feedback patterns may be indicative of, for example, efficiency of the presentation session, efficiency of the presentation stream, suitability of the presentation stream for the spectators 210, teaching skills of the presenter 212 and/or the like. For example, the feedback analytics engine 266 may apply one or more trained machine learning algorithms, for example, for example, a neural network, a Support Vector Machine (SVM), a decision tree, a K-Nearest Neighbors (KNN) algorithm and/or any other trained learning algorithm as known in the art to detect the feedback pattern(s).

For example, based on the analysis of the analytics reports, the feedback analytics engine 266 may identify a feedback pattern indicative that a timing of the presentation session may significantly affect effectivity of the session. For example, assuming a certain presentation stream was presented in a plurality of presentation sessions at different times of the day to a plurality of spectators 210 of the same age. Further assuming, an aggregated involvement score calculated for presentation sessions conducted early in the morning is significantly higher than the aggregated involvement score calculated for presentation sessions conducted in the afternoon. This may be indicative that the presentation session may be significantly more effective when conducted in the morning.

In another example, based on the analysis of the analytics reports, the feedback analytics engine 266 may identify a feedback pattern indicative that a certain presentation steam is not suitable for one or more groups of spectators 210. For example, assuming a certain presentation stream was presented in a plurality of presentation sessions to spectators 210 of different age groups where in each presentation session the spectators 210 were of the same age group. Further assuming an aggregated content score calculated for presentation sessions conducted for young spectators 210 is significantly lower than the aggregated content score calculated for presentation sessions conducted for older spectators 210. This may be indicative that the presentation stream may be unsuitable for the younger age group. In contrast, assuming an aggregated emotional score calculated for presentation sessions conducted for the older spectators 210 indicates a "bored" state of mind, this may be indicative that the presentation stream may be unsuitable for the older age group.

In another example, based on the analysis of the analytics reports, the feedback analytics engine 266 may identify a feedback pattern indicative that a certain presentation image is inefficient and/or ineffective. For example, assuming a certain presentation image was presented in a plurality of presentation sessions to a plurality of spectators 210. Further assuming the aggregated content score calculated for the certain presentation image is significantly low, this may be indicative that a major part of the spectators 210 did not understand the content of the certain presentation image.

The feedback analytics engine 266 may further generate one or more recommendations for adjusting the presentation stream, one of more of the presentation images, the presentation session and/or the like. For example, continuing the previous example, assuming a certain feedback pattern indicates the certain presentation image is inefficient and/or ineffective. Moreover, assuming that another feedback pattern identified for another presentation image (of the same presentation stream and/or of one or more other presentation streams) containing substantially similar content as the certain presentation image indicates the other presentation image(s) is highly efficient and/or effective. In such case the feedback analytics engine 266 may generate one or more recommendations to adjust the one or more presentation elements of the certain presentation image according to the other presentation image(s), for example, a content element (e.g. adding/removing/changing content, etc.), a visibility element (e.g. content layout, content font size, drawing arrangement, etc.) and/or the like. Adjusting the certain presentation image according to the other presentation image(s) may significantly improve the efficient and/or effective of the certain presentation image.

It is expected that during the life of a patent maturing from this application many relevant systems, methods and computer programs will be developed and the scope of the term machine learning algorithms is intended to include all such new technologies a priori.

As used herein the term "about" refers to ±10%.

The terms "comprises", "comprising", "includes", "including", "having" and their conjugates mean "including but not limited to".

The term "consisting of" means "including and limited to".

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A computer implemented method of calculating feedback parameters for presentation images presented to on-site spectators, comprising:

obtaining a presentation stream comprising a sequence of a plurality of presentation images presented via a display to at least one spectator located on site;

analyzing the presentation stream to identify a plurality of presentation periods of a presentation session, during each of the plurality of presentation periods an associated one of the plurality of presentation images is presented to the at least one spectator;

receiving, via a network, a plurality of feedback messages transmitted by at least one client device used by the at least one spectator to provide a feedback to at least one of the plurality of presentation images, the at least one client device independent of the display is unsynchronized with timing of the presentation images of the presentation stream;

temporally correlating each of the plurality of feedback messages with at least one of the plurality of presentation images according to a reception time of the respective feedback message with respect to the presentation period of the at least one presentation image; and transmitting the plurality of correlated feedback messages to at least one feedback analysis system adapted to calculate at least one feedback parameter for the at least one presentation image based on the feedback extracted from at least one of the plurality of feedback messages correlated with the at least one presentation image.

2. The computer implemented method of claim 1, wherein the feedback comprising at least one of: a content feedback to a content of the at least one presentation image and an emotional feedback indicative of a state of mind of the at least one spectator.

3. The computer implemented method of claim 1, further comprising at least one of the plurality of feedback messages is transmitted by the at least one client device in response to at least one feedback request transmitted to the at least one client device during at least one of the plurality of presentation periods.

4. The computer implemented method of claim 3, wherein the at least one feedback request is transmitted according to at least one feedback request indication embedded within the presentation stream.

5. The computer implemented method of claim 3, wherein the at least one feedback request is transmitted in response to an instruction received from a client device used by a presenter conducting the presentation session.

6. The computer implemented method of claim 3, wherein the at least one feedback request is automatically generated in case an involvement score calculated for the at least one spectator is lower than a predefined threshold, the involvement score calculated based on the at least one feedback parameter is indicative of an involvement level of the at least one spectator.

7. The computer implemented method of claim 1, further comprising adjusting in real-time at least one of the plurality of presentation periods according to a reception rate of at least some of the plurality of feedback messages.

8. The computer implemented method of claim 1, wherein the at least one feedback parameter comprises at least one member of a group consisting of: an involvement score indicative of an involvement level of the at least one spectator expressed by a count of feedback messages initiated by the at least one spectator, a content score indicative of understanding of the at least one spectator of a content presented by the at least one presentation image, and an emotional score indicative of a state of mind of the at least one spectator during presentation of the at least one presentation image.

9. The computer implemented method of claim 1, further comprising adjusting in real-time at least one of the plurality of presentation periods according to the at least one feedback parameter.

10. The computer implemented method of claim 1, wherein the at least one feedback analysis system is further adapted to generate at least one alert to a client device used by a presenter of the presentation session, the at least one alert is generated based on the at least one feedback parameter according to at least one predefined feedback activity rule.

11. The computer implemented method of claim 10, wherein the at least one feedback analysis system is further adapted to generate a plurality of alerts prioritized according to priorities defined based on the at least one of:

the at least one feedback parameter identified for the at least one spectator during at least one previous presentation session attended by the at least one spectator, and at least one feedback classification rule.

12. The computer implemented method of claim 1, wherein the at least one feedback analysis system is further adapted to generate a spectator feedback report for the at least one spectator based on the at least one feedback parameter calculated for a plurality of feedback events in which the at least one spectator provided feedback during the presentation session.

13. The computer implemented method of claim 12, wherein the at least one feedback analysis system is further adapted to adjust the spectator feedback report according to the at least one feedback parameter calculated for the at least one spectator during a plurality of previous presentation sessions attended by the at least one spectator.

14. The computer implemented method of claim 1, wherein the at least one feedback analysis system is further adapted to generate a presenter feedback report for a presenter conducting the presentation session based on the at least one feedback parameter calculated for a plurality of feedback events in which the at least one spectator provided feedback during the presentation session.

15. The computer implemented method of claim 14, wherein the at least one feedback analysis system is further adapted to adjust the presenter feedback report according to the at least one feedback parameter calculated for a plurality of previous presentation sessions conducted by the presenter.

16. The computer implemented method of claim 1, wherein the at least one feedback analysis system is further adapted to generate at least one feedback analytics for at least one aggregated feedback parameter created by aggregating the at least one parameter calculated for a plurality of spectators attending the presentation session.

17. The computer implemented method of claim 16, wherein the at least one feedback analysis system is further adapted to apply at least one machine learning algorithm to the at least one feedback analytics generated for the presentation stream during a plurality of presentation sessions to identify at least one feedback pattern for at least one of the presentation images.

18. The computer implemented method of claim 17, wherein the at least one feedback analysis system is further adapted to generate at least one recommendation for adjusting at least one presentation element of the at least one presentation image based on analysis of the at least one feedback pattern.

19. A system for calculating feedback parameters for presentation images presented to on-site spectators, comprising:

a program store storing a code;

at least one processor coupled to the program store is adapted to execute the stored code, the code comprising a plurality of program instructions which, when executed by the at least one processor, cause the at least one processor to:

obtain a presentation comprising a sequence of a plurality of presentation images presented via a display to at least one spectator located on site;

analyze the presentation stream to identify a plurality of presentation periods of a presentation session, during each of the plurality of presentation periods an associated one of the plurality of presentation images is presented to the at least one spectator;

receive, via a network, a plurality of feedback messages transmitted by at least one client device used by the at least one spectator to provide a feedback to at least one of the plurality of presentation images, the at least one client device independent of the display is unsynchronized with timing of the presentation images of the presentation stream;

temporally correlate each of the plurality of feedback messages with at least one of the plurality of presentation images according to a reception time of the respective feedback message with respect to the presentation period of the at least one presentation image; and transmit the plurality of correlated feedback messages to at least one feedback analysis system adapted to calculate at least one feedback parameter for the at least one presentation image based on the feedback extracted from at least one of the plurality of feedback messages correlated with the at least one presentation image.

20. The system of claim 19, further comprising the at least one processor is integrated in a receiver integrating the at least one feedback analysis system.

* * * * *